US010818043B1

(12) United States Patent
Barnes et al.

(10) Patent No.: US 10,818,043 B1
(45) Date of Patent: Oct. 27, 2020

(54) TEXTURE INTERPOLATION USING NEURAL NETWORKS

(71) Applicant: Adobe Inc., San Jose, CA (US)

(72) Inventors: Connelly Barnes, Seattle, WA (US); Sohrab Amirghodsi, Seattle, WA (US); Michal Lukac, San Jose, CA (US); Elya Shechtman, Seattle, WA (US); Ning Yu, College Park, MD (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/392,968

(22) Filed: Apr. 24, 2019

(51) Int. Cl.
*G06T 11/00* (2006.01)
*G06T 7/40* (2017.01)

(52) U.S. Cl.
CPC .............. *G06T 11/001* (2013.01); *G06T 7/40* (2013.01); *G06T 2207/20081* (2013.01); *G06T 2207/20084* (2013.01)

(58) Field of Classification Search
CPC ....................... G06T 11/001; G06T 7/40; G06T 2207/20081; G06T 2207/20084; G06F 30/27; G06N 3/0454
See application file for complete search history.

(56) References Cited

PUBLICATIONS

Arjovsky et al., "Wasserstein gan", arXiv preprint arXiv:1701.07875, Dec. 6, 2017, 32 pages.
Barnes et al., "Patchmatch: A randomized correspondence algorithm for structural image editing", ACM Transactions on Graphics (ToG), 28(3):24, 2009, 10 pages.
Bergmann et al., "Learning texture manifolds with the periodic spatial GAN", arXiv:1705.065662, Sep. 8, 2017, 10 pages.
Binkowski et al., :Demystifying MMD GANs, arXiv preprint arXiv:1801.01401,Mar. 21, 2018, 36 pages.
Cimpoi et al, "Describing textures in the wild", In Proceedings of the IEEE Conf. on Computer Vision and Pattern Recognition (CVPR), 2014, 8 pages.
Darabi et al., "Image melding: Combining inconsistent images using patch-based synthesis", ACM Trans. Graph., 31(4):82-1, 2012, 10 pages.
Diamanti et al., "Synthesis of complex image appearance from limited exemplars", ACM Transactions on Graphics (TOG), 34(2):22, 2015, 13 pages.

(Continued)

*Primary Examiner* — Antonio A Caschera
(74) *Attorney, Agent, or Firm* — Finch & Maloney PLLC

(57) ABSTRACT

An example method for neural network based interpolation of image textures includes training a global encoder network to generate global latent vectors based on training texture images, and training a local encoder network to generate local latent tensors based on the training texture images. The example method further includes interpolating between the global latent vectors associated with each set of training images, and interpolating between the local latent tensors associated with each set of training images. The example method further includes training a decoder network to generate reconstructions of the training texture images and to generate an interpolated texture based on the interpolated global latent vectors and the interpolated local latent tensors. The training of the encoder and decoder networks is based on a minimization of a loss function of the reconstructions and a minimization of a loss function of the interpolated texture.

20 Claims, 14 Drawing Sheets

(56) References Cited

PUBLICATIONS

Efros et al., "Image quilting for texture synthesis and transfer", In Proceedings of the 28th annual conference on Computer graphics and interactive techniques, pp. 341-346. ACM, 2001.
Efros et al., Texture synthesis by nonparametric sampling, IEEE International Conference on Computer Vision, Sep. 1999, 6 pages.
Gatys et al., "Texture synthesis using convolutional neural networks", arXiv:1505.07376, Nov. 6, 2015, 10 pages.
Gatys et al., Image style transfer using convolutional neural networks:, In Proceedings of the IEEE Conference on Computer Vision and Pattern Recognition, pp. 2414-2423, 2016.
Goodfellow et al; "Generative adversarial nets", arXiv:1406.2661, Jun. 10, 2014, 9 pages.
Gulrajani et al., "Improved training of wasserstein GANs", arXiv:1704.00028, Dec. 25, 2017, 20 pages.
Heeger et al., "Pyramid-based texture analysis/synthesis", In Proceedings of the 22nd annual conference on Computer graphics and interactive techniques, pp. 229-238. ACM, 1995.
Heusel et al., "GANs trained by a two time-scale update rule converge to a local nash equilibrium", In Advances in Neural Information Processing Systems, 2017, 12 pages.
Huang et al., "Arbitrary style transfer in realtime with adaptive instance normalization", arXiv:1703.06868, Jul. 30, 2017, 11 pages.
Isola et al., "Image-to-image translation with conditional adversarial networks", In IEEE Conference on Computer Vision and Pattern Recognition, pp. 1125-1134, 2017.
Jetchev et al., "Texture synthesis with spatial generative adversarial networks", arXiv preprint arXiv:1611.08207, 2016, 11 pages.
Johnson et al., "Perceptual losses for real-time style transfer and super-resolution", arXiv:1603.01855, Mar. 27, 2016, 18 pages.
Karras et al., "Progressive growing of GANs for improved quality, stability, and variation", arXiv preprint arXiv:1710.10196, Feb. 26, 2017, 26 pages.
Kaspar et al., "Self tuning texture optimization", In Eurographics, vol. 34, 2015, 11 pages.
Kwatra et al., "Texture optimization for example-based synthesis", In ACM Transactions on Graphics (ToG), vol. 24, pp. 795-802. ACM, 2005.
Kwatra et al., "Graphcut textures: image and video synthesis using graph cuts", ACM Transactions on Graphics (ToG), 22(3):277-286, 2003.
Lefebvre et al., "Appearance-space texture synthesis", In ACM Transactions on Graphics (ToG), vol. 25,pp. 541-548. ACM, 2006.
Li et al., "Precomputed real-time texture synthesis with markovian generative adversarial networks", arXiv:1604.04382, Apr. 15, 2016, 17 pages.
Li et al."Diversified texture synthesis with feed-forward networks", In Proc. CVPR, 2017, 9 pages.
Li et al., "Universal style transfer via feature transforms", arXiv:1705.08086, Nov. 17, 2017, 11 pages.
Liu et al., "Image inpainting for irregular holes using partial convolutions", arXiv:1804:07723, Dec. 15, 2018, 23 pages.
Matusik et al., "Texture design using a simplicial complex of morphable textures", In ACM Transactions on Graphics (TOG), vol. 24, pp. 787-794. ACM, 2005.
Perez et al., "Poisson image editing", ACM Transactions on graphics (TOG), 22(3):313-318, 2003.
Portilla et al., "A parametric texture model based on joint statistics of complex wavelet coefficients", International journal of computer vision, 40(1):49-70, 2000.
Risser et al., "Stable and controllable neural texture synthesis and style transfer using histogram losses", arXiv preprint arXiv:1701.08893, Feb. 1, 2017, 14 pages.
Salimans et al., "Improved techniques for training GANs", arXiv:1606.03498, Jun. 10, 2016, 10 pages.
Sendik et al., "Deep correlations for texture synthesis", ACM Transactions on Graphics (TOG), 36(5), pp. 161-161:15, 2017.
Szegedy et al., "Inception-v4, inception-resnet and the impact of residual connections on learning", arXiv:1602.07261, Aug. 23, 2016, 12 pages.
Ulyanov et al., "Texture networks: Feed-forward synthesis of textures and stylized images", arXiv:1603.03417, Mar. 10, 2016, 16 pages.
Wei et al., "Fast texture synthesis using treestructured vector quantization", In Proceedings of the 27th annual conference on Computer graphics and interactive techniques, pp. 479-488. ACM Press/Addison-Wesley Publishing Co., 2000.
Wexler et al., "Space-time completion of video", IEEE Transactions on Pattern Analysis & Machine Intelligence, (3):463-476, 2007.
Yang et al., "High-resolution image inpainting using multi-scale neural patch synthesis", arXiv:1611.09969, Apr. 13, 2017, 9 pages.
Yu et al., "Free-form image inpainting with gated convolution", arXiv preprint arXiv:1806.03589, Jun. 10, 2018, 12 pages.
Yu et al., "Generative image inpainting with contextual attention", In CVPR, 2018, pp. 5505-5514.
Zhang et al., The unreasonable effectiveness of deep features as a perceptual metric:, In CVPR, 2018, pp. 586-595.
Zhou et al., "Non-Stationary texture synthesis by adversarial expansion", arXiv:1805.04487, May 11, 2018, 13 pages.
Zhu et al., "Unpaired image-to-image translation using cycle-consistent adversarial networks", arXiv:1703.10593, Nov. 15, 2018, 18 pages.
Zhu et al., "Toward multimodal image-to-image translation", arXiv:1711.11586, Oct. 24, 2018, 12 pages.
Byrd et al., "A limited memory algorithm for bound constrained optimization", SIAM Journal on Scientific Computing, 16(5):1190-1208, 1995, 25 pages.
He et al., "Deep residual learning for image recognition", arXiv:1512.03385, Dec. 10, 2015, 12 pages.
Kingma et al., "ADAM: A method for stochastic optimization", arXiv preprint arXiv:1412.6980, Jan. 30, 2014, 15 pages.

Spatial Texture Interpolation
100
Source Texture $S_1$
110
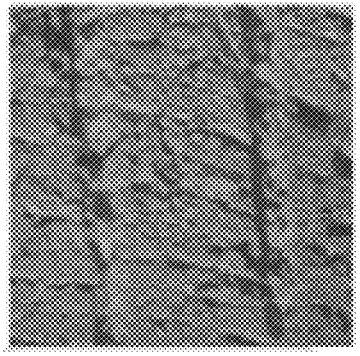
Source Texture $S_2$
120
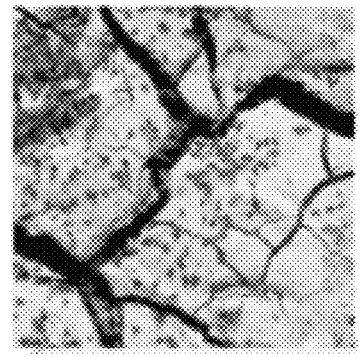
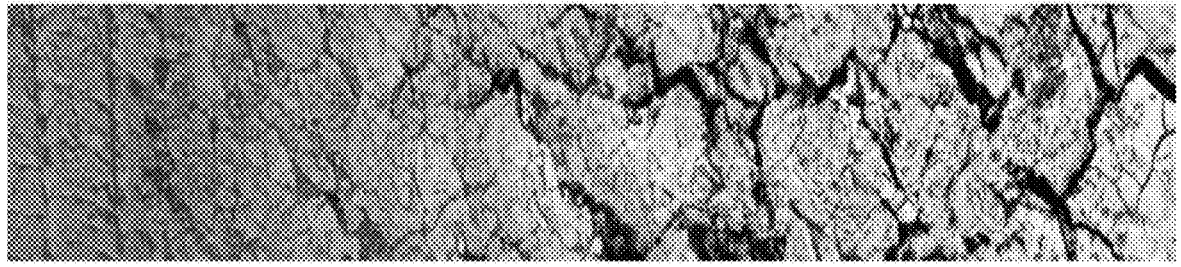
Range of Texture Interpolation
130
FIG. 1A Cross-Fade Texture
Interpolation
140

150 152 154 156 158

Shuffling – Adjacent Patches
900b

Pre-Shuffle
950

| 1  | 2  | 3  | 4  |
|----|----|----|----|
| 5  | 6  | 7  | 8  |
| 9  | 10 | 11 | 12 |
| 13 | 14 | 15 | 16 |

Post-Shuffle
960

| 2  | 6  | 4  | 8  |
|----|----|----|----|
| 5  | 1  | 7  | 3  |
| 10 | 14 | 12 | 16 |
| 13 | 9  | 15 | 11 |

TEXTURE INTERPOLATION USING NEURAL NETWORKS

FIELD OF THE DISCLOSURE

This disclosure relates to image processing. Particularly, this disclosure relates to techniques for neural network based image texture interpolation for the purpose of blending two or more textures to form a new texture.

BACKGROUND

Texture interpolation or blending of textures in digital images is a common and important task in many photographic workflows. Many materials, whether naturally occurring or manmade, exhibit variation in local appearance (e.g., texture, luminance, reflectivity, opaqueness, etc), as well as complex transitions between different materials. For example, a close examination of pebbles on a sandy beach may reveal that the size, density, and color of pebbles can change. Additionally, the sand may change in color due to being wet, dry, or mixed with the pebbles. If a user wishes to edit the texture of materials in an image, however, it can be challenging to create rich and spatially-varying material combinations that mimic the conditions found in the natural world.

Because of the complex appearance of textures, creating transitions by interpolating between them on the pixel (or visual) domain is difficult. Naïve attempts to do so can result in unpleasant artifacts such as ghosting, visible seams, and obvious or readily detectable repetitions that ultimately look unnatural, forced, or otherwise not native to the original image. There are some existing techniques for texture interpolation, which rely heavily on ad hoc analysis that is specific to the given image. Unfortunately, however, due to the hand-crafted or customized nature of their objectives, such existing techniques cannot learn from a large variety of textures in the natural world and frequently result in less pleasing transitions. Furthermore, these techniques tend to be computationally complex and therefore slow, due to the specificity of the objectives relative to the native data.

BRIEF DESCRIPTION OF THE DRAWINGS

FIG. 1A illustrates an example of spatial texture interpolation in an image processing application, in accordance with an embodiment of the present disclosure.

DETAILED DESCRIPTION

As noted previously, texture interpolation is an important but difficult task in many photographic or digital art workflows. Texture interpolation, including the blending or editing of two or more textures of one or more images, involves synthesizing gradual transitions between those two or more textures. One type of transition is a spatial interpolation which can provide realistic transitions between materials in an image, such as, for example, a gradual transition between sand and pebbles on a beach, or a transition between grass and mud, or a transition between different types of stone surfaces or animal fur patterns. A second type of transition is a cross-fading interpolation (also referred to as cross-dissolve) in which a first texture, such as green grass, and a second texture, such as brown grass, can be used to generate a resultant texture (or more generally, a video) that interpolates between the two input textures.

Texture interpolation can also be useful for constructing texture palettes, which are similar to color palettes or wheels that include all available colors, but where instead textures are sparsely placed on a palette (either by the user or algorithmically), and the regions between each texture are interpolated so that the user can select any point to pick out a novel texture from the palette. To this end, it would be desirable to have a system that allows the user to provide, and/or select from, a palette of various texture images, and to control the blending of those texture images with relative ease so as to readily obtain a desired output image that includes a combination of textures. Additionally, it would be desirable for the system to enable the user to control the incorporation of the interpolated textures into an end product image using familiar and efficient photo manipulation tools, including, for example, an eyedropper and paintbrush, or the like.

For example, FIG. 1A illustrates a spatial texture interpolation example 100, in accordance with an embodiment of the present disclosure. Two example source textures, $S_1$ 110 and $S_2$ 120, of ground surfaces are shown. Source textures such as these may be provided as input images to a texture interpolation system, as described herein, either for training or for operation/testing. A range of possible output texture interpolations 130 is also shown. As can be seen, the output of a texture interpolation system, according to an embodiment of the present disclosure, can range from source texture $S_1$ 110 on the left to source texture $S_2$ 120 on the right, running through a gamut of intermediate blendings of the two textures. As will be appreciated, these intermediate blending each represent a combination of source texture $S_1$ 110 on the left to source texture $S_2$ 120, where pixel values of both sources are used to compute intermediate pixel values having attributes of both source pixels.

Figure 1B:
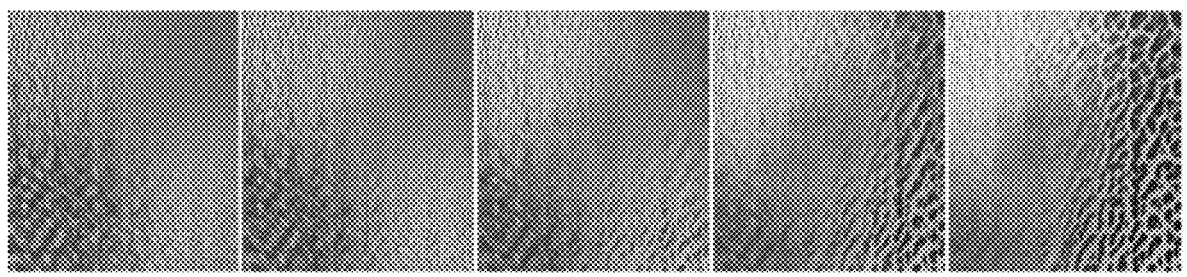
FIG. 1B illustrates an example of cross-fade texture interpolation in an image processing application, in accordance with an embodiment of the present disclosure.

FIG. 1B illustrates an example of cross-fade (or cross-dissolve) texture interpolation 140. A sequence of video frames 150, 152, . . . 158 exhibit a cross-fade effect between two textures that blend over time. This is accomplished by varying interpolation weight factors over time, as will be described in greater detail below.

Figure 2:
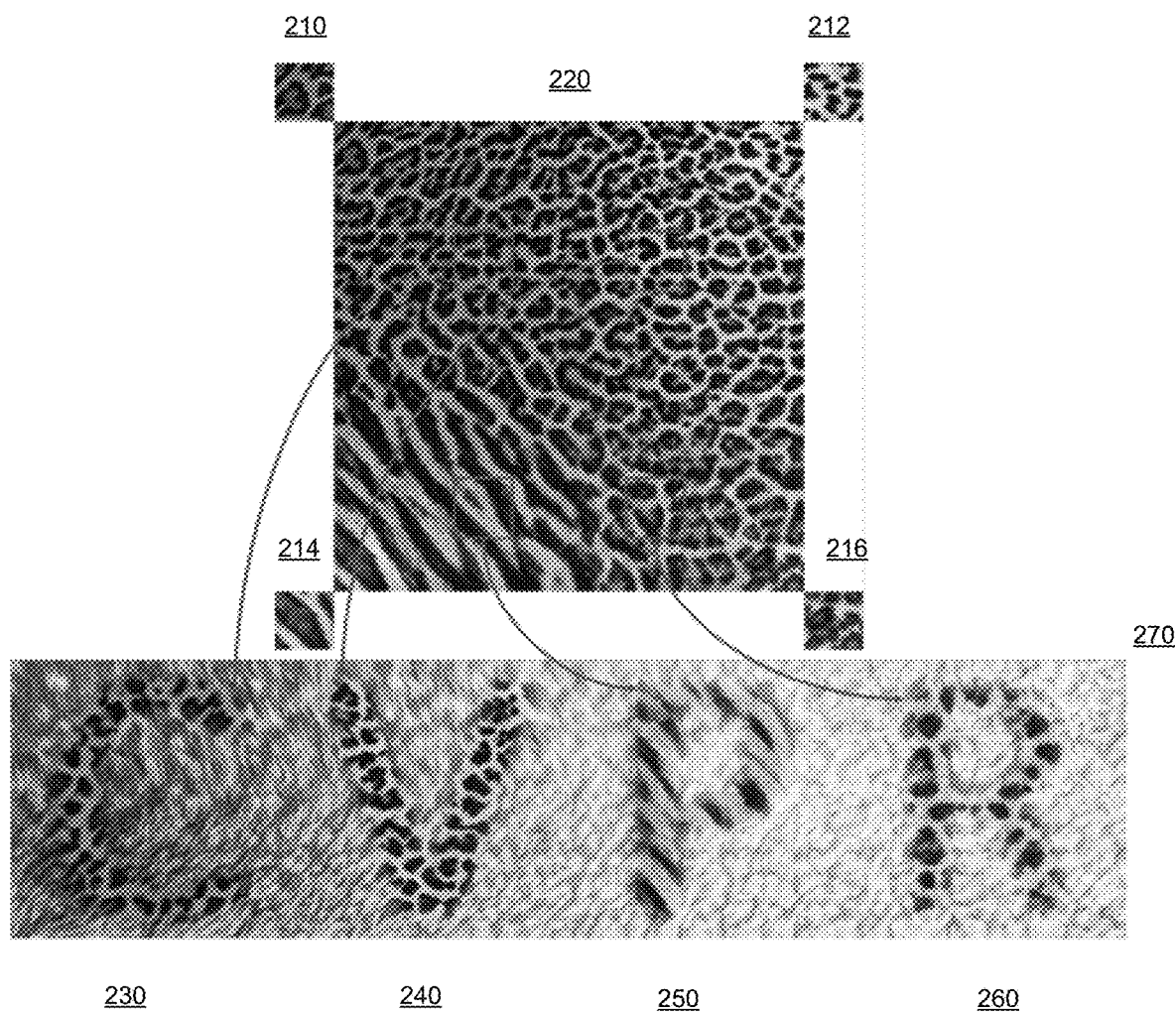
FIG. 2 illustrates an example of texture interpolation in a painting application, in accordance with another embodiment of the present disclosure.

FIG. 2 illustrates another example of texture interpolation, in this case in a painting application 200, in accordance with an embodiment of the present disclosure. In this example, four source textures of animal prints 210, 212, 214, 216, are shown to be blended into a resulting interpolated texture 220. As can be seen, the interpolation is transitional, with a blending towards each of the four source textures in their respective corners. The resulting interpolation 220 can be useful, for instance, in an art or paint application that includes a number of tools, such as an eyedropper and a painting tool. For example, the user can select a texture from the interpolation 220 using an eyedropper tool at a desired location, and then paint or otherwise apply that selected texture with a paintbrush or other tool onto some other background image or canvas. FIG. 2 further illustrates an example use case 270 wherein the letter C 230 is painted with a texture closely resembling 210, the letter V 240 is painted with a texture closely resembling 212, the letter P 250 is painted with a texture closely resembling 214, and the letter R 260 is painted with a texture closely resembling 216.

Thus, the present disclosure provides a system and methodology for texture interpolation. As will be explained in turn, the system according to an embodiment includes one or more convolutional neural networks trained for image encoding and decoding which facilitate both user control along with realistic and smooth texture interpolation. According to one example such embodiment, a neural network encoder for global features, a neural network encoder for local features, and a neural network decoder are trained based on minimization of texture image reconstruction losses and interpolation losses. This allows the neural networks to learn how to synthesize larger textures and to create smooth transitions (interpolations) between any given pair of textures, as will be explained in greater detail below. This approach addresses the difficulty of interpolating between textures in the image domain by projecting these textures from the given image domain onto a latent feature (or non-visual) domain where they may be linearly interpolated, and then decoding them back into the image domain to obtain the desired result. In order to satisfy the goals of controllability and visual realism, the deep neural network is simultaneously trained for both tasks. A reconstruction task ensures that when a texture is passed through an encoder and then a decoder (autoencoder), the result will be the similar to the input. This allows the user to specify texture at any given point of the output by example. An interpolation task uses a discriminator to ensure that linear interpolations of latent vectors also decode into plausible textures, so that the regions of the output not directly specified by the user are realistic and artifact-free.

In more detail, a methodology implementing the techniques according to an embodiment includes training a global encoder neural network to generate global latent vectors based on training texture images, and training a local encoder neural network to generate local latent tensors based on the training texture images. The method further includes interpolating between the global latent vectors associated with each set of training images, and interpolating between the local latent tensors associated with each set of training images. The method further includes training a decoder neural network to generate reconstructions of the training texture images and to generate an interpolated texture based on the interpolated global latent vectors and the interpolated local latent tensors. In an embodiment, the training of the encoder and decoder neural networks is based on a minimization of a loss function of the reconstructions and a minimization of a loss function of the interpolated texture, as will be described in greater detail below.

The trained deep neural network may then be used to interpolate images in an operational mode, employing user control weighting factors to adjust the emphasis of each input texture on the generated output texture. The user provided input texture images are projected into the latent space using the trained encoders to allow for linear interpolation. In some embodiments, the neural network may then optionally apply one or more latent-space operations of tiling, interpolation, and shuffling. The tiling operation extends the texture spatially to any arbitrary size. The interpolation operation uses weighted combinations of two or more textures in the latent domain. The shuffling operations swaps adjacent, small squares within the latent domain to reduce repetitions. The trained decoder then returns the processed latent domain data to the image domain to generate the interpolated result, as will be described in greater detail below.

Thus, the foregoing framework provides a network based approach for user controlled texture interpolation. The disclosed techniques provide an efficient method for texture interpolation that can be incorporated into familiar and efficient existing photo manipulation tools. These techniques offer significant advantages over existing methods that require manipulation/editing of the image in the visual domain, are computationally complex procedures that often fail to produce acceptable results. Numerous configurations and variations will be apparent in light of this disclosure.

System Architecture

Figure 3:
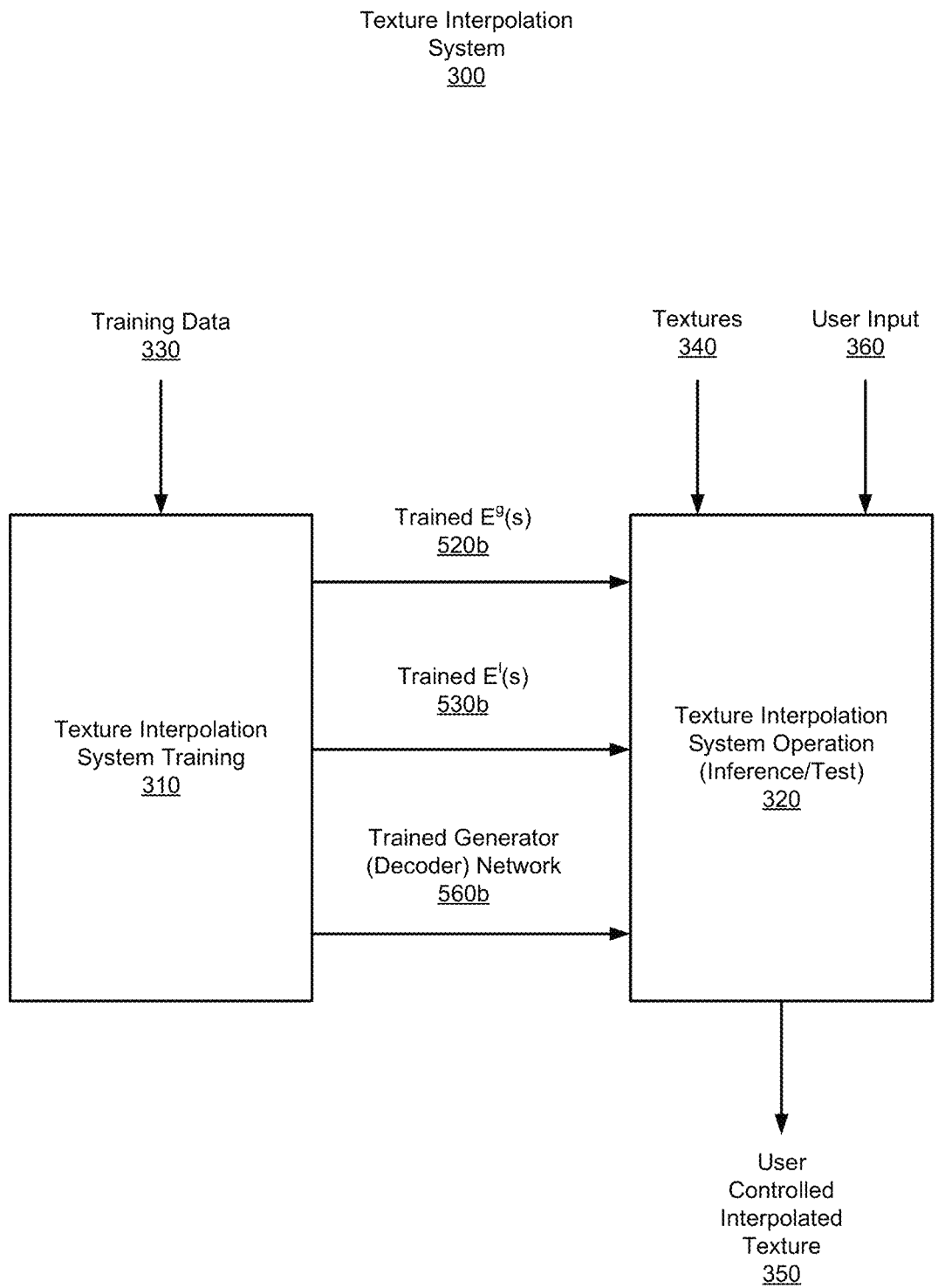
FIG. 3 is a top-level block diagram of training and operation of a texture interpolation system, configured in accordance with an embodiment of the present disclosure.

FIG. 3 is a top-level block diagram of training and operation of a texture interpolation system 300, configured in accordance with an embodiment of the present disclosure. The texture interpolation system 300 is shown to include a texture interpolation system training module 310, and a texture interpolation system operational module 320.

The texture interpolation system training module 310 is configured to train one or more global encoder neural networks ($E^g$) 520b, one or more local encoder neural networks ($E^l$) 530b, and a generator or decoder neural network (G) 560b, for use by the texture interpolation system operational module 320. The training is based on training data 330 which comprises a body of training texture images. The texture interpolation system training module 310, and the training process, is described in detail below in connection with the description of FIGS. 4-6.

The texture interpolation system operation module is configured to perform texture interpolation on input texture images 340, using the trained neural networks 520b, 530b, and 560b. The operation of the texture interpolation system 320 may also be referred to as inference or testing. In some embodiments, texture interpolation is controlled by user input 360, which may include selection of input texture images 340, specification of the weighting or emphasis to be placed on each texture image, and other functions as described herein. The texture interpolation system operation module 320 is described in greater detail below in connection with the description of FIGS. 7 and 8.

Figure 4:
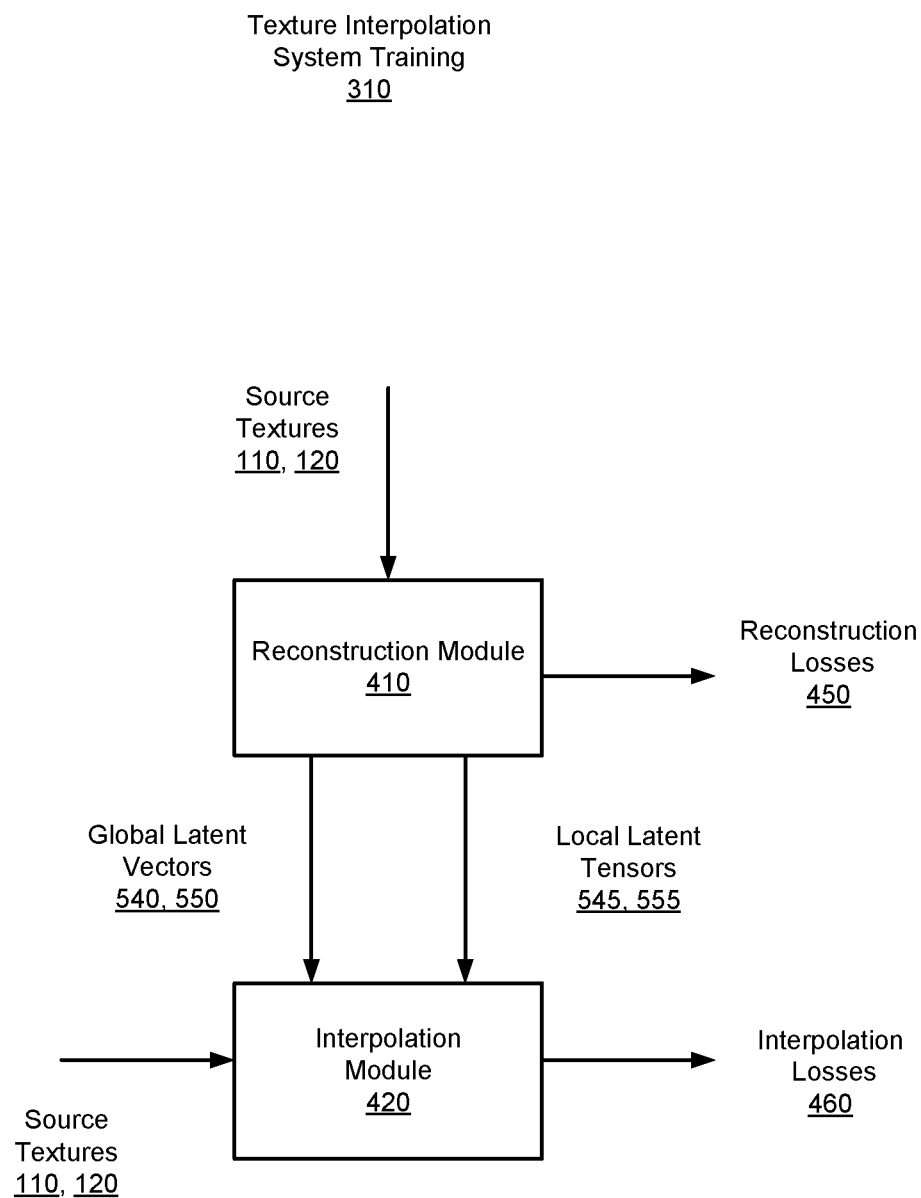
FIG. 4 is a block diagram that further illustrates training of the texture interpolation system as shown in FIG. 3, configured in accordance with an embodiment of the present disclosure.

FIG. 4 is a top-level block diagram for training 310 of the texture interpolation system, configured in accordance with an embodiment of the present disclosure. The texture interpolation system training module 310 is shown to include a reconstruction module 410, and an interpolation module 420. At a high-level, the training is based on minimizing reconstruction losses 450 and interpolation losses 460. Reconstruction losses 450 measure how well the trained encoder/decoder combination can faithfully reproduce input source textures, as one aspect of system performance. Interpolation losses 460 measure how well the trained encoder/decoder combination can produce a plausible synthetically generated interpolation that is similar to some combination of the input source textures, as another aspect of the performance of the system. The operations of reconstruction module 410 and interpolation module 420 are described in greater detail below in connection with FIGS. 5 and 6 respectively.

Figure 5:
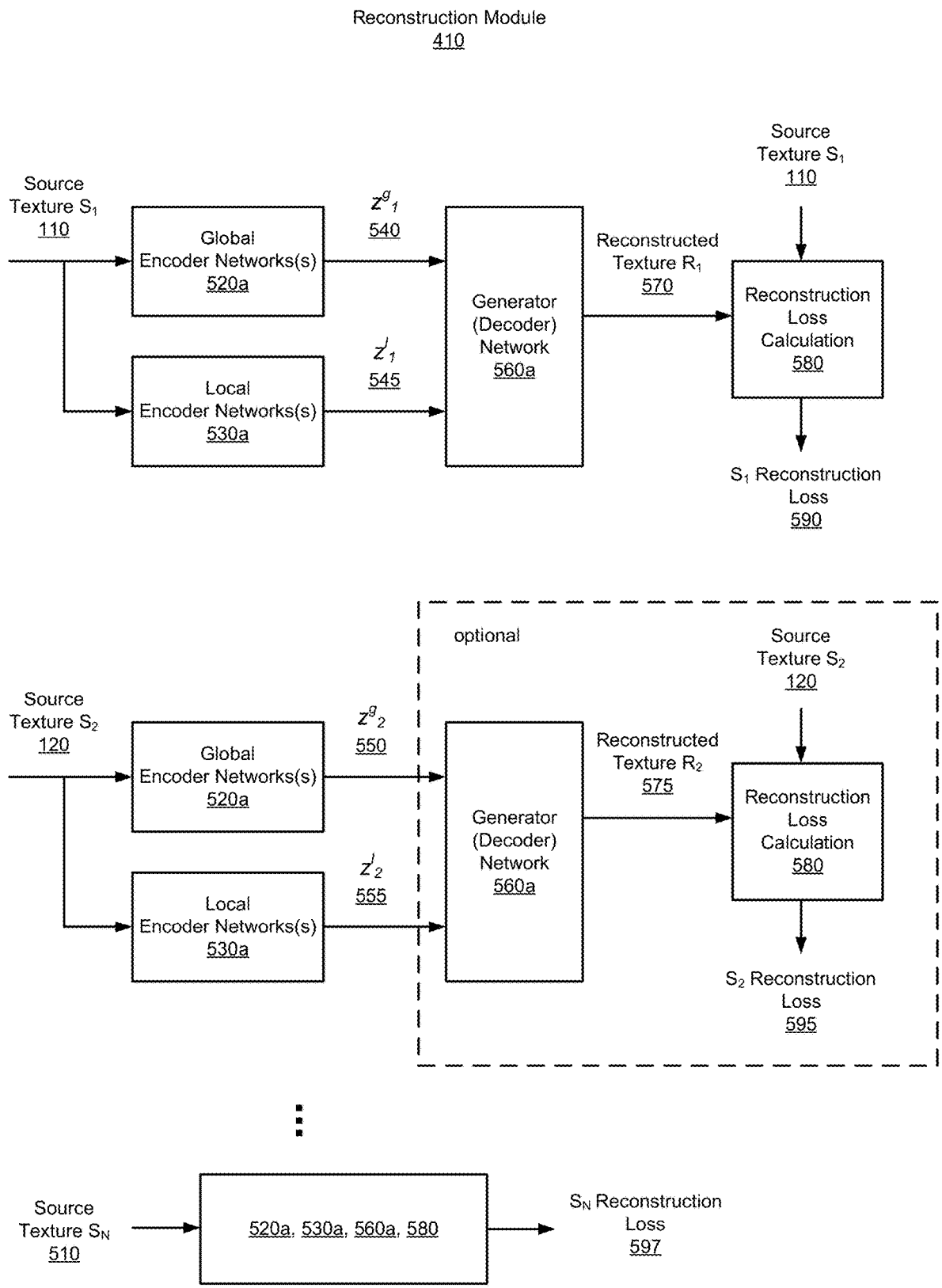
FIG. 5 is a block diagram of the reconstruction module for training, shown in FIG. 4, and configured in accordance with an embodiment of the present disclosure.

FIG. 5 is a block diagram of a reconstruction module 410 for training, configured in accordance with an embodiment of the present disclosure. The reconstruction module 410 is shown to include one or more global encoder network ($E^g$) 520a to be trained, one or more local encoder networks ($E^l$) 530a to be trained, a generator or decoder network (G) 560a to be trained, and a reconstruction loss calculation module 580.

One or more training texture images, for example source textures $S_1$ 110, $S_2$ 120, . . . $S_N$ 510 are provided to the global encoder network 520a and the local encoder network 530a, as part of the training process. Reconstruction losses $S_1$ 590, $S_2$ 595, . . . $S_N$ 597 are determined. In the following description of the reconstruction module 410, the processing of two source textures $S_1$ 110 and $S_2$ 120 will be described, but it will be appreciated that in some embodiments, the reconstruction may be performed on just a single source texture, or on any number N of source textures.

Global encoder network 520a is configured or trained to generate a first set of global latent vectors $z^g_1$ 540 based on the first training texture image $S_1$ and to generate a second set of global latent vectors $z^g_2$ 550 based on the second training texture image $S_2$. The global latent vectors can also be viewed as latent tensors with spatial size 1×1.

Local encoder network 530a is configured or trained to generate a first set of local latent tensors $z^l_1$ 545 based on the first training texture image $S_1$ and to generate a second set of local latent tensors $z^l_2$ 555 based on the second training texture image $S_2$. The local latent tensors of the spatial size that is a factor of m smaller than the size of the input texture. In some embodiments m is set to 4. The use of both global latent vectors and local latent tensors allows the system to both synthesize larger textures and interpolate between two different textures. In this manner, the network learns to perform well for both single and multiple texture synthesis.

In some embodiments, more than one local encoder network 530a may be trained. In such case, each local encoder network may be associated with a different patch size (e.g., regions of differing spatial dimensions) of the texture image. For example, there could be one local encoder network with a 16×16 pixel patch size and one local encoder network with an 4×4 pixel patch size. In such case, the global encoder may capture global texture information, the local encoder network with the 16×16 patch size may capture mid-level information about larger scale structures in the texture such as larger cracks or structures, and the local encoder network with the 4×4 patch size may capture finer-scale information such as the colors and displacements of fine-scale pebbles.

Additionally, in some alternative embodiments, the global encoder network 520a may be omitted, resulting in a somewhat simpler system, with a trade-off of possibly reduce performance. Decoder network 560a is configured or trained to generate reconstructions $R_1$ 570 and $R_2$ 575 of the respective source textures $S_1$ 110 and $S_2$ 120 based on the global latent vectors 540, 550 and the local latent tensors 545, 555. In some embodiments, decoder network 560a may be configured as a generative adversarial network (GAN). The decoder network or generator 560a is fully convolutional, so that it can generate output textures of arbitrary size: the output texture size is directly proportional to the size of the local latent tensors.

Reconstruction loss calculation module 580 is configured to compare the reconstructed textures to the source textures and calculate $S_1$ and $S_2$ reconstruction losses 590, 595 that measure how well the encoder/decoder combination can faithfully reproduce the source textures, as one aspect of the performance of the system. Said differently, the reconstruction task ensures that every input texture, after being encoded and then decoded, results in a similar output texture. In some embodiments, the reconstruction loss calculation uses a weighted combination of three losses: a pixel-wise L1 loss $L_{pix(rec)}$ (i.e., a sum of absolute differences loss), a Gram matrix loss $L_{Gram(rec)}$, and an adversarial loss $L_{adv(rec)}$. These three loss calculations may be expressed by the following equations:

$$L_{pix(rec)} = \|R_1 - S_1\|_1 + \|R_2 - S_2\|_1$$

$$L_{Gram(rec)} = L_{Gram}(R_1, S_1) + L_{Gram}(R_2, S_2)$$

$$L_{adv(rec)} = L_{adv}(R_1, S_1 | D_{rec}) + L_{adv}(R_2, S_2 | D_{rec}),$$

where $L_{adv}(A, B | D_{rec}) = D_{rec}(A) - D_{rec}(B) + GP(A, B | D_{rec})$

Here, A and B represent the pair of images, $D_{rec}$ is the adversarially trained reconstruction discriminator, and GP(•) is the gradient penalty regularization term.

The reconstruction losses 590, 595 are employed as feedback during the iterative training process on subsequent training texture images to minimize the losses and improve the performance of the networks 520a, 530a, and 560a being trained.

Figure 6:
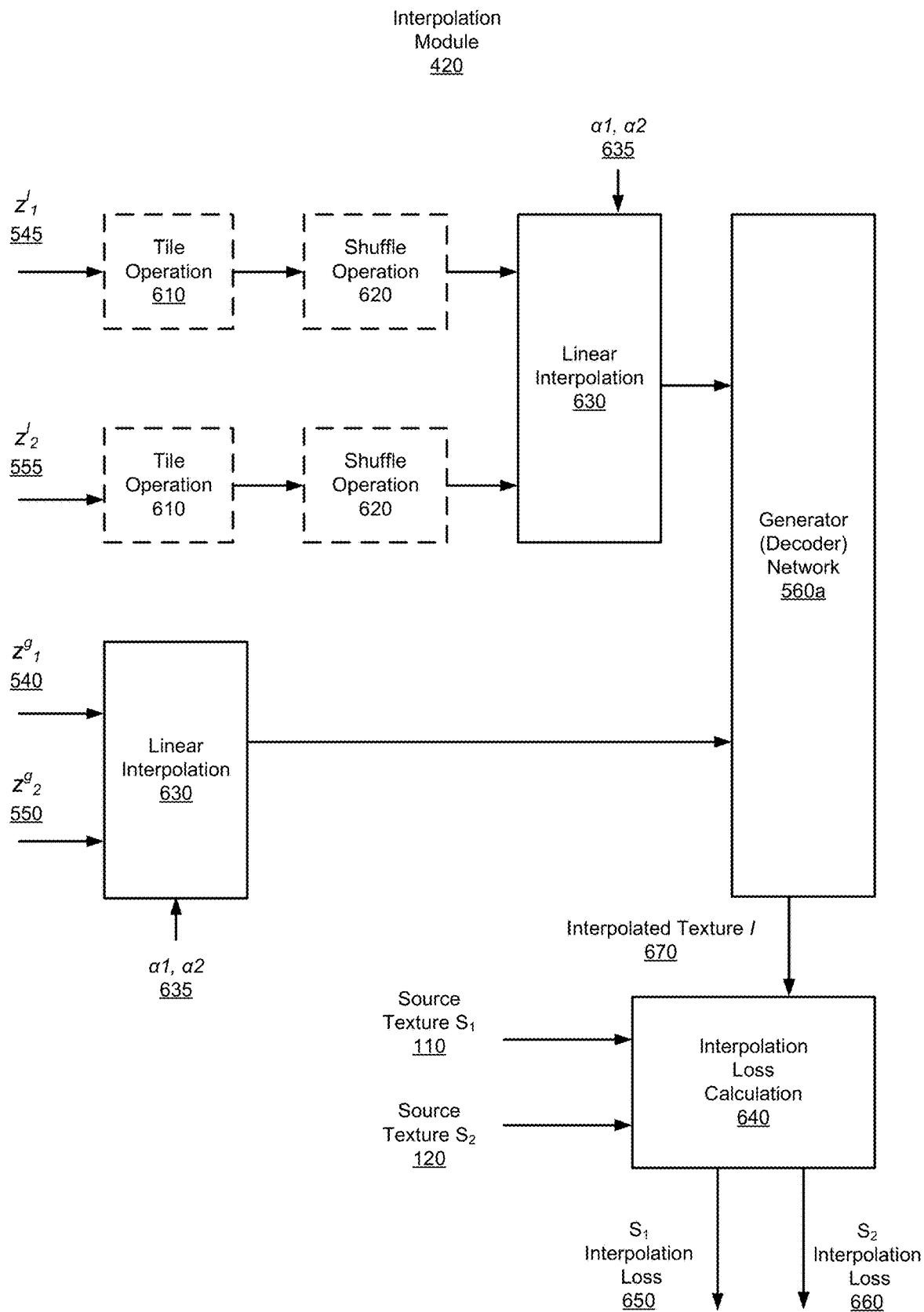
FIG. 6 is a block diagram of an interpolation module for training, shown in FIG. 4, and configured in accordance with an embodiment of the present disclosure.

FIG. 6 is a block diagram of an interpolation module 420 for training, configured in accordance with an embodiment of the present disclosure. The interpolation module 420 is shown to include an optional tiling operation module 610, an optional shuffle operation module 620, a linear interpolation module 630, an interpolation loss calculation module 640, and the generator (decoder) network 560a to be trained.

Optional tiling operation module 610 is configured to perform a spatial tiling or duplication of the local latent tensors 545, 555, for example to enlarge the generated images by a selected factor. In some embodiments, the local latent tensors are tiled by a factor of 3×3, where 3 is chosen because this is the smallest integer that can synthesize transitions over the four edges of the local latent tensors, and because this relatively small tiling factor minimizes computational cost. In some embodiments, where optional tiling operation module 610 is not included, the texture interpolation system would not be trained to spatially synthesize the texture, but would still be able to cross-dissolve textures.

Figure 9A:
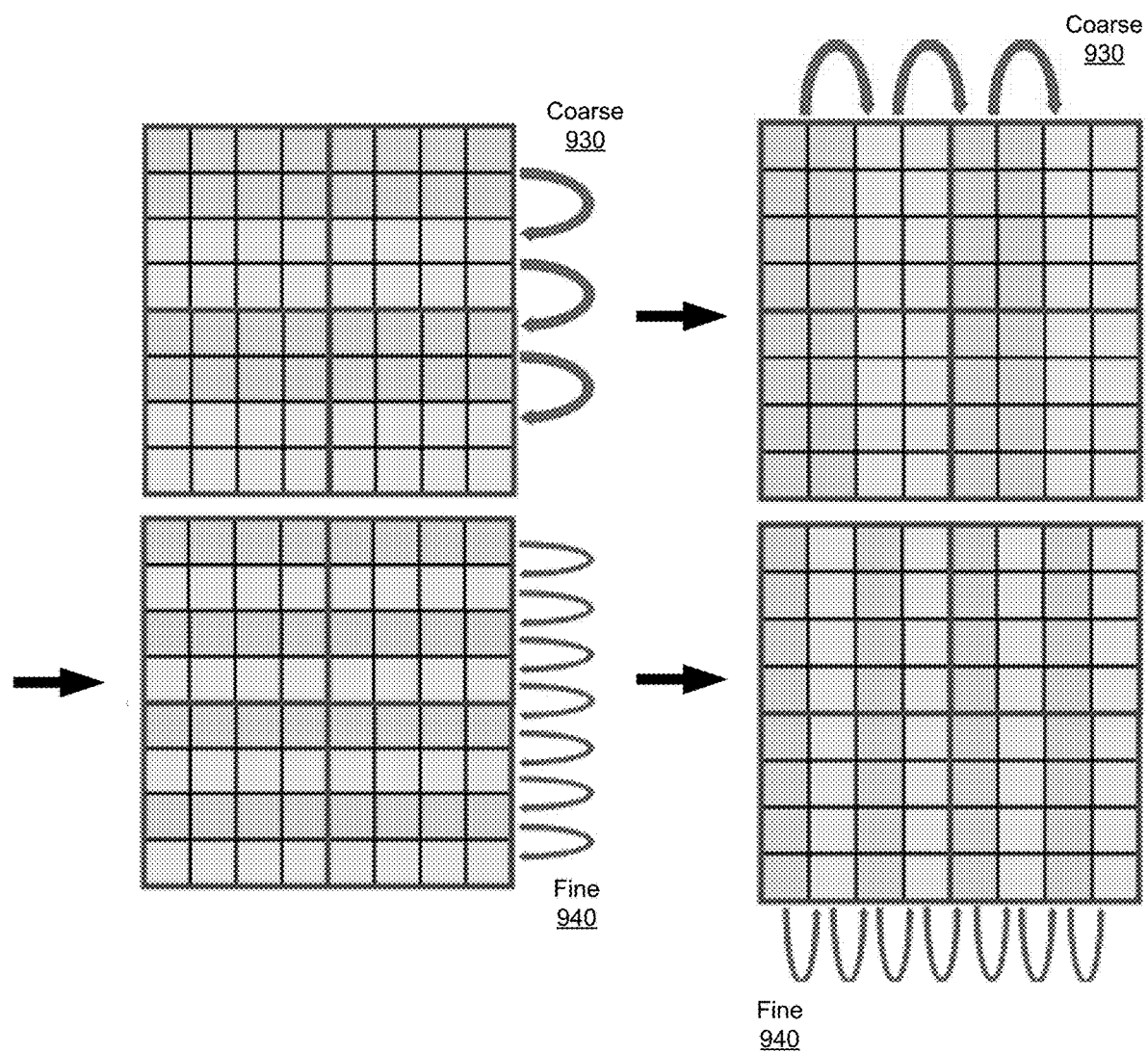
FIG. 9A illustrates a row/column shuffling operation, in accordance with an embodiment of the present disclosure.

While the tiling operation can be beneficial for regular textures, in the case of semi-regular or stochastic textures, the tiling can introduce two artifacts: undesired spatial repetition and undesired seams on the borders between tiles. Thus, optional shuffle operation module 620 is configured to perform a shuffle of the tiled local latent tensors to reduce these undesired artifacts. In some embodiments, the shuffle may be a random or pseudorandom shuffle. Random shuffling in the latent space not only results in more varied decoded image appearance, which reduces visual repetition, but also softens seams by spatially swapping pixels in the latent space across the border of two latent tensors. In some embodiments, random shuffling 900a is implemented by row swapping 910 and column swapping 920 over several spatial scales ranging from coarse 930 to fine 940, as illustrated in FIG. 9A. In some embodiments, the spatial scales are powers of two, where the coarsest scale is half the size of the local latent tensor. For each scale, a random shuffling is applied to cells of the grid for that scale, and the shuffling proceeds through grid rows in a top-down and then a bottom-up order where each row is randomly swapped with the succeeding row with a probability of 0.5. Similarly, this is repeated on grid columns with column swapping from left to right and right to left, for example. Additionally, because the synthesize texture should ideally transition smoothly between regions where there are user-specified texture constraints and regions where there are no such constraints, the shuffling procedure is overridden at the four corners of the tiled latent tensor.

Figure 9B:
FIG. 9B illustrates a patch shuffling operation, in accordance with an embodiment of the present disclosure.

In some embodiments, random shuffling 900b may be performed by swapping adjacent patches, as illustrated in FIG. 9B, as an alternative to swapping adjacent rows and columns. In the pre-shuffle illustration 950 the patches are numbered consecutively from 1 to 16. The post-shuffle illustration 960 shows one example of random swapping of adjacent patches.

Linear interpolation module 630 is configured to interpolate between the first set and the second set of the global latent vectors to generate interpolated global latent vectors. Linear interpolation module 630 is further configured to interpolate between the tiled and shuffled first set of local latent tensors and the tiled and shuffled second set of local latent tensors, to generate interpolated local latent tensors. The global latent vector interpolation and the local latent tensor interpolation are based on linear weighting factors a1, a2 635, which in some embodiments, are randomly selected from a uniform probability distribution ranging from 0 to 1, where a2=1−a1. This allows the networks to be trained to handle multiple texture interpolations with varying weighting factors or emphasis on each texture. In some embodiments, other interpolation methods (i.e., as opposed to linear) may be employed. It will be appreciated that although only two source textures were used in the description of this example, in some embodiments interpolation training may be based on any number of source textures.

Decoder network 560a is further configured or trained to generate an interpolated texture 1670, of the respective source textures $S_1$ 110 and $S_2$, 120 based on the interpolated global latent vectors and the interpolated local latent tensors. In some embodiments, this decoder network may share the same trained parameters as the decoder network used in the reconstruction task illustrated in FIG. 5.

Interpolation loss calculation module 640 is configured to compare the original source textures $S_1$ 110 and $S_2$ 120 to cropped regions of the interpolated texture 1670 and to generate interpolation losses 650, 660 that measure how well the encoder/decoder combination can produce a synthetically generated interpolation that is similar to some combination of the source textures $S_1$ and $S_2$, as another aspect of the performance of the system. Said differently, the interpolation task ensures that interpolations of latent tensors also decode into plausible textures. In some embodiments, the interpolation loss calculation uses a weighted combination of a Gram matrix loss $L_{Gram(itp)}$, and an adversarial loss $L_{adv(itp)}$. These loss calculations may be expressed by the following equations:

$$L_{Gram(itp)} = \alpha_1 L_{Gram}(I_{crop}, S_1) + \alpha_2 L_{Gram}(I_{crop}, S_2)$$

$$L_{adv(itp)} = \alpha_1 L_{adv}(I_{crop}, S_1 | D_{itp}) + \alpha_2 L_{adv}(I_{crop}, S_2 | D_{itp})$$

where $I_{crop}$ is a randomly selected crop from the interpolated texture 670, and $D_{itp}$ is the adversarially trained interpolation discriminator.

The interpolation losses 650, 660 (along with reconstruction losses 590, 595 described above) are employed as feedback during the iterative training process on subsequent training texture images to minimize the losses and improve the performance of the networks 520a, 530a, and 560a being trained. The training objective may be expressed by the following equation:

$$\min_{E^l, E^g, G} \max_{D_{rec} D_{itp}} E_{S_1 S_2} (\lambda_1 L_{pix(rec)} + \lambda_2 L_{Gram(rec)} + \lambda_3 L_{adv(rec)} + \lambda_4 L_{Gram(itp)} + \lambda_5 L_{avd(itp)})$$

where the λ parameters are chosen to balance the order of magnitude of each loss term, which are not sensitive to the data set.

Figure 7:
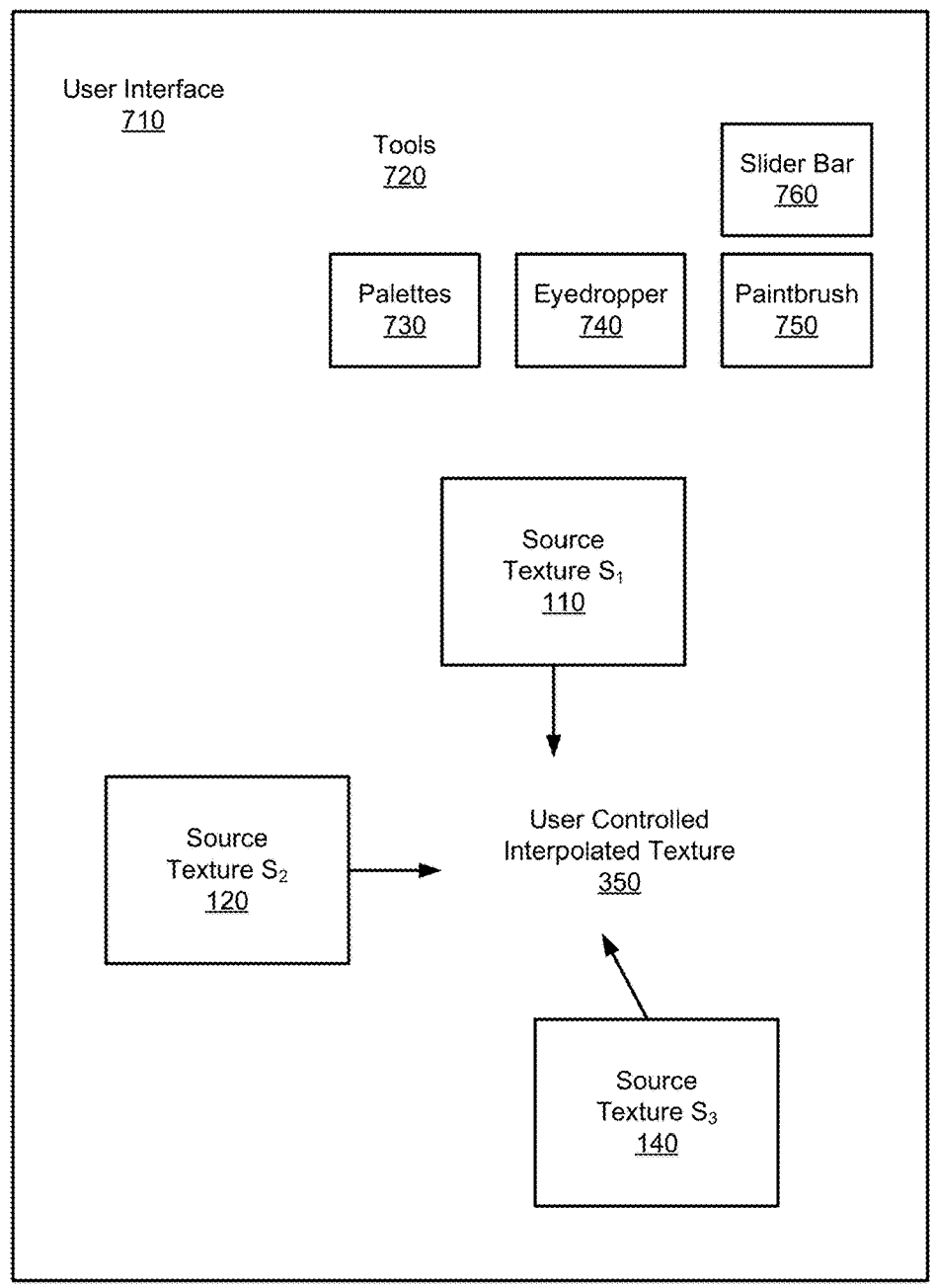
FIG. 7 illustrates an overview of the texture interpolation system operation from the perspective of a user interface, configured in accordance with an embodiment of the present disclosure.

FIG. 7 illustrates an overview of the texture interpolation system operation 700 from a user interface, in accordance with an embodiment of the present disclosure. In this example, user interface 710 is shown to include a variety of tools 720 including, but not limited to, texture palettes 730, an eyedropper 740, a paintbrush 750, and a slider bar 760. A number of source textures 110, 120, 140 may also be presented to the user, or provided by the user. The tools are configured to provide the user with a variety of techniques for selecting textures to be interpolated into an end product, user controlled interpolated texture 350, and for selecting the degree of contribution of each source texture and/or the placement of that source texture into that end product 350. For example, in some embodiments slider bar 760 may be used, to control the interpolation weighting factors assigned to each source texture (as will be explained in greater detail below in connection with FIG. 8). In some embodiments, the eyedropper 740 and paintbrush 750 may allow the user to select portions of source textures and paint them into the end product 350. It will be appreciated that any number of photo manipulation or image processing tools to be adapted to allow the user to control the interpolation process.

Figure 8:
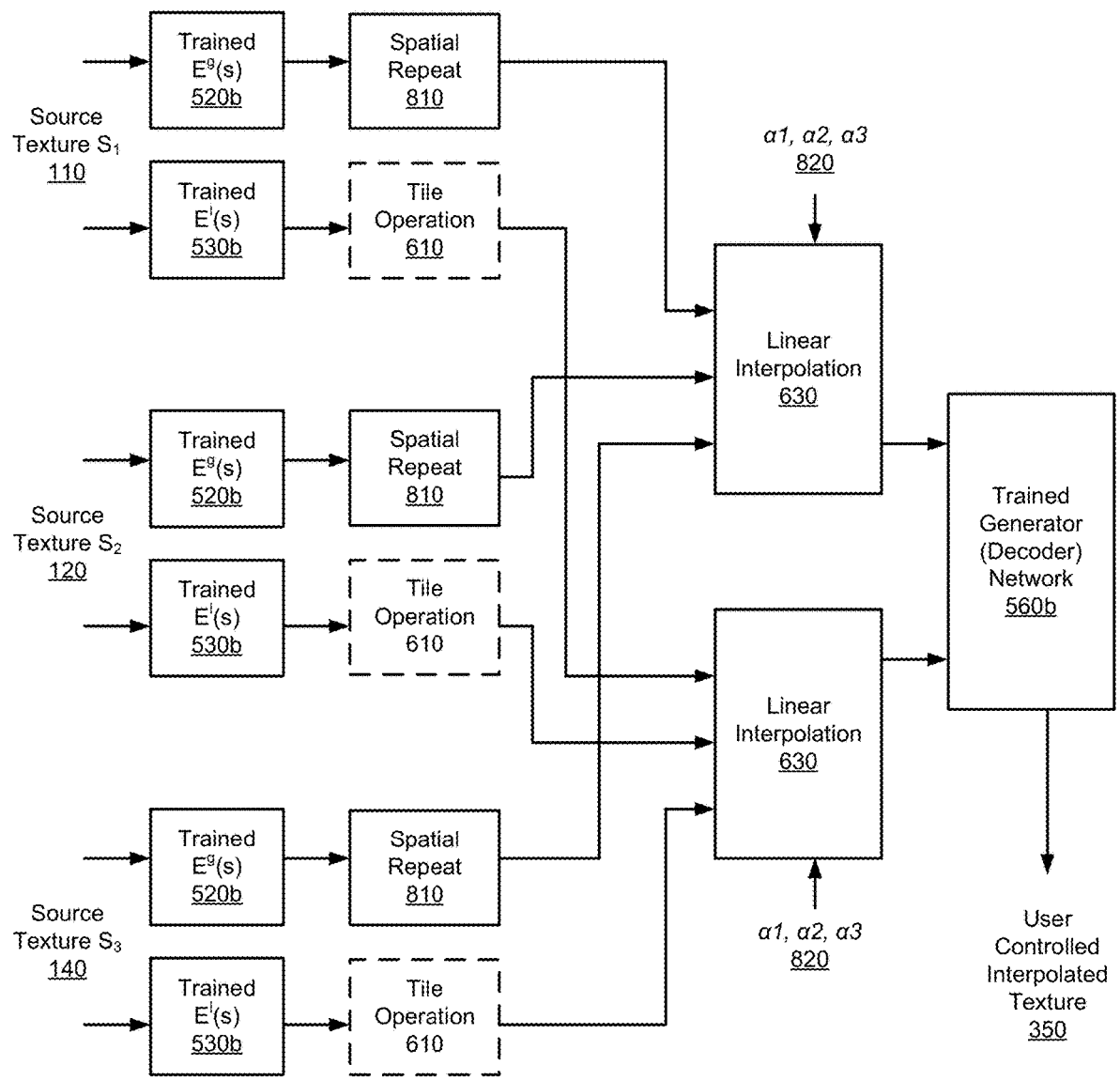
FIG. 8 is a block diagram that further illustrates operation of the texture interpolation system as shown in FIG. 3, configured in accordance with an embodiment of the present disclosure.

FIG. 8 is a block diagram for operation 320 of the texture interpolation system, configured in accordance with an embodiment of the present disclosure. The operational texture interpolation system 320 is shown to include the trained global encoder network ($E^g$) 520b, the trained local encoder network ($E^l$) 530b, a spatial repetition module 810, the optional tiling operation module 610, linear interpolation modules 630, and the trained generator/decoder network (G) 560b.

During system operation, also referred to as inference or testing, any number of source texture images $S_1$ 110, $S_2$ 120, $S_3$ 140, etc., may be provided to the system 320 for interpolation. The trained global encoder networks 520*b* and local encoder networks 530*b* are applied to the texture images to generate global latent vectors and local latent tensors respectively, for each texture image. The encoders 520*b* and 530*b* are trained as previously described in connection with FIGS. 5 and 6.

Spatial repetition module 810 is configured to perform a spatial repetition operation on each of the sets of global latent vectors. The spatial repetition comprises reshaping the global latent vectors into tensors and repeating the tensors to match the spatial dimensions of the local latent tensors. The optional tiling operational module 610 is configured to perform a spatial tiling on each of the sets of local latent tensors, as previously described with respect to the training operation.

Linear interpolation module 630 is configured to interpolate between the sets of spatially repeated global latent vectors to generate a global vector interpolation. Linear interpolation module 630 is further configured to interpolate between the sets of tiled local latent tensors to generate a local tensor interpolation. The global vector interpolation and the local tensor interpolation are based on linear weighting factors a1, a2, a3, etc. 820, which provide weighting to each of the sets of spatially repeated global latent vectors and each of the sets of tiled local latent tensors. In some embodiments, the linear weighting factors are user provided or heuristically selected and allow for a degree of user control over the interpolation process by determining how much emphasis to put on each source texture image 110, 120, 140. For example, if the user desires that the interpolated image more closely resemble the source texture image 110, with just a small influence from textures 120 and 140, then a1 may be set to a relatively high value compared to a2, and a3. In some embodiments, other interpolation methods (i.e., as opposed to linear) may be employed.

The decoder network 560*b* is configured or trained to generate a user controlled interpolated texture 350 based on the global vector interpolation and the local tensor interpolation. The decoder 560*b* is trained as previously described in connection with FIGS. 5 and 6.

Methodology

Figure 10:
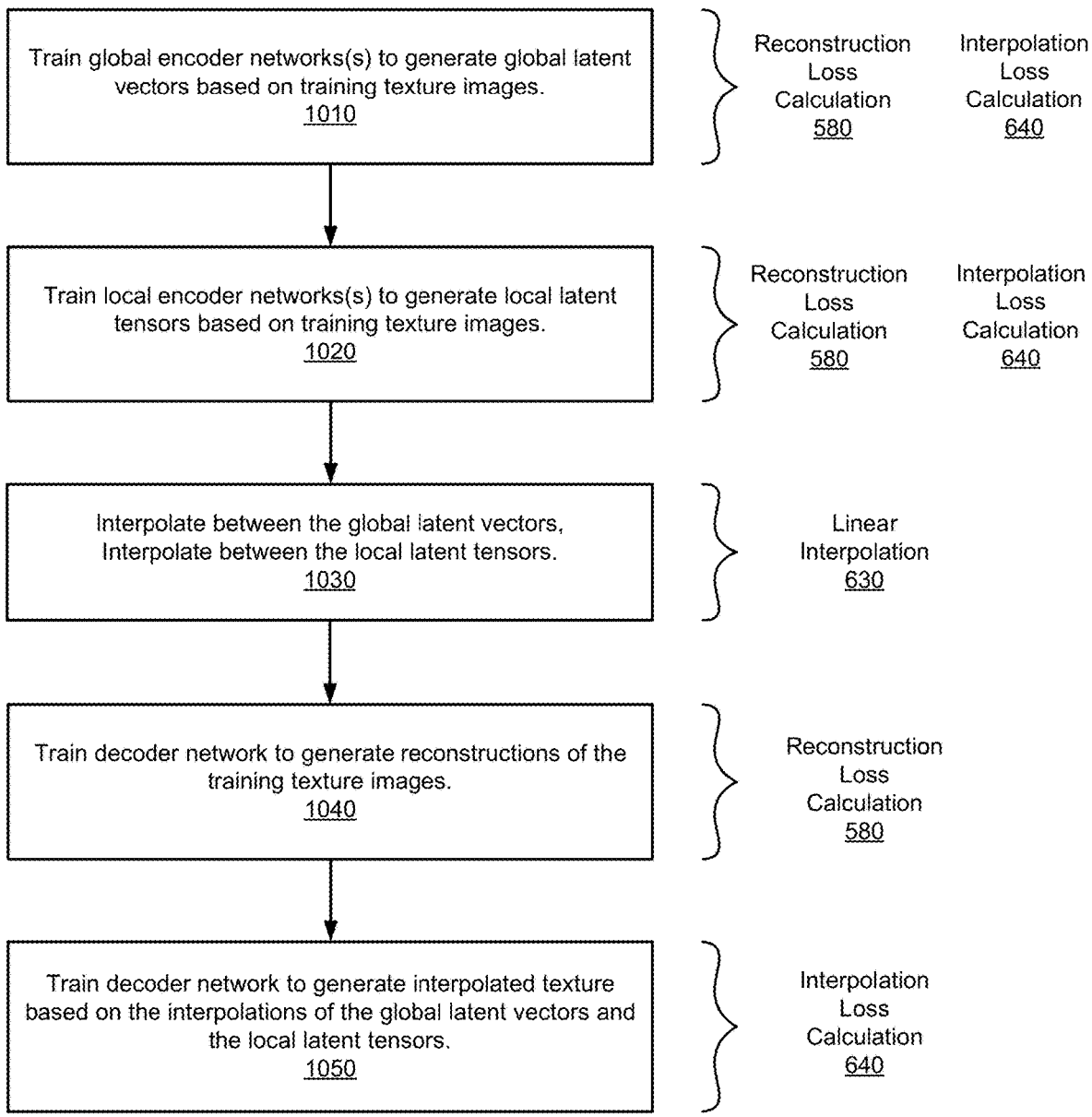
FIG. 10 is a flowchart illustrating a method for training a neural network based texture interpolation system, in accordance with an embodiment of the present disclosure.

FIG. 10 is a flowchart 1000 illustrating a method for training a neural network based texture interpolation system, in accordance with an embodiment of the present disclosure. As can be seen, the method is described with reference to the configuration of texture interpolation system training module 310, of FIG. 4, and the components thereof from FIGS. 5 and 6. However, any number of module configurations can be used to implement the method, as will be appreciated in light of this disclosure. Further note that the various functions depicted in the method do not need to be assigned to the specific example modules shown. To this end, the example methodology depicted is provided to give one example embodiment and is not intended to limit the methodology to any particular physical or structural configuration. In some embodiments, the training operations described below can be performed in any sequential order, or jointly (e.g., in an end-two-and manner), or in other combinations of these two approaches.

The method commences, at operation 1010, by training a global encoder network to generate sets of global latent vectors based on one or more training texture images.

The method continues, at operation 1020, by training a local encoder network to generate sets of local latent tensors based on the on one or more training texture images.

In some embodiments, an optional spatial tiling operation may be performed on the local latent tensors and an optional shuffle operation may be performed on the tiled local latent tensors. The shuffle operation may be a random shuffle of the tiled local latent tensors by row and column over a range of spatial scales or the shuffle operation may be a random shuffle of adjacent patches.

At operation 1030, an interpolation is performed between a first set of global latent vectors and a second set of global latent vectors. An interpolation is also performed between the first set of local latent tensors and the second set of local latent tensors.

At operation 1040, a decoder network is trained to generate a reconstruction of one or more training texture images. At operation 1050, the decoder network is trained to generate an interpolated texture based on the interpolated global latent vectors and the interpolated local latent tensors. In some embodiments, the decoder network is a generative adversarial network.

The training of the global encoder network, the local encoder network, and the decoder network is based on a minimization of a loss function of the reconstruction(s) and a minimization of a loss function of the interpolated texture. In some embodiments, the loss function of the reconstruction(s) comprises one or more of a pixel-wise sum of absolute differences loss, a Gram matrix loss, and an adversarial loss, and the loss function of the interpolated texture comprises one or more of a Gram matrix loss, and an adversarial loss.

In some embodiments, additional operations are performed. For example, in one embodiment, the global latent vector interpolation and the local latent tensor interpolation are based on linear weighting factors which may be randomly sampled from a range of 0 to 1 for training purposes.

Figure 11:
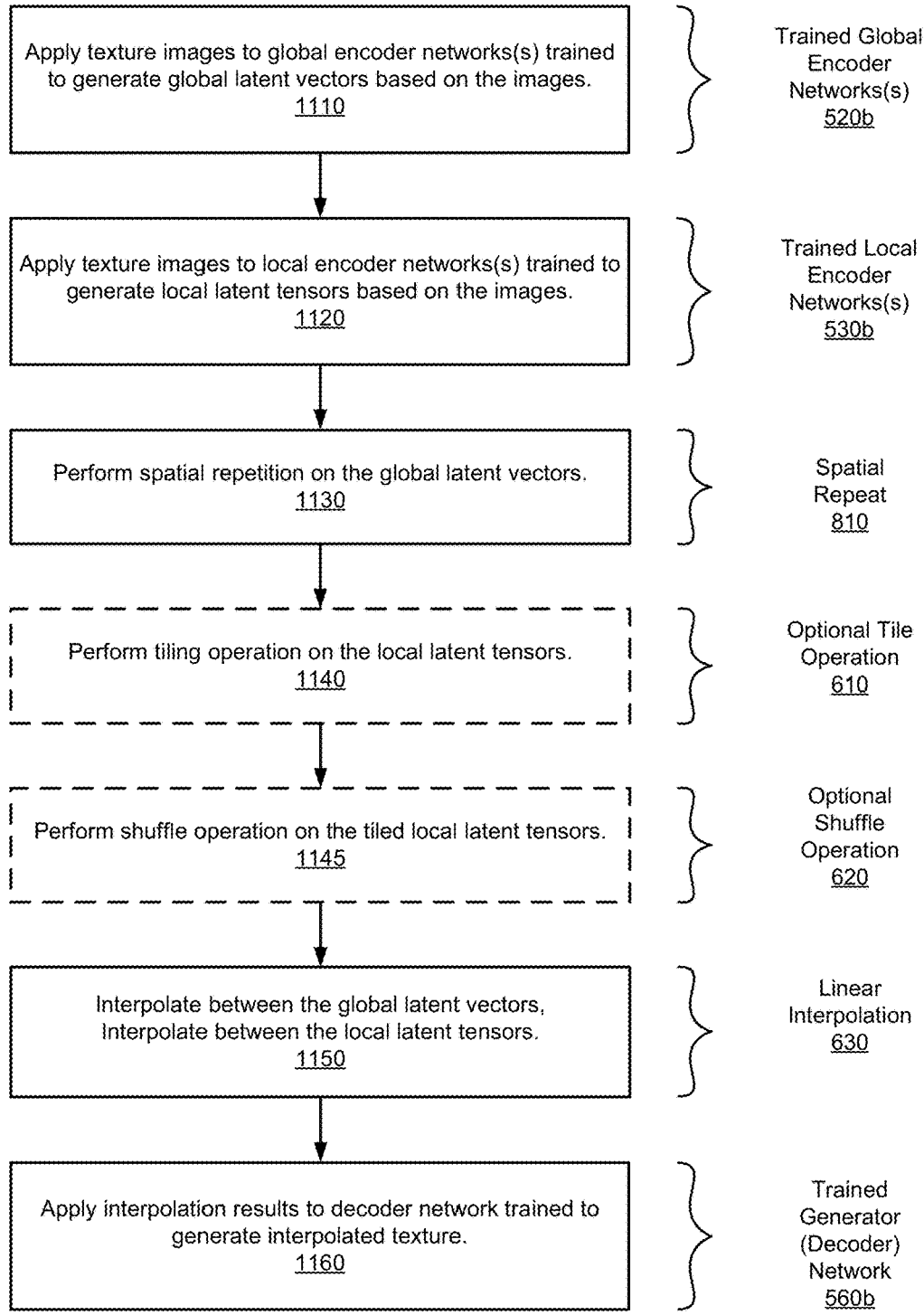
FIG. 11 is a flowchart illustrating a method for texture interpolation, either spatial or cross-fade, in accordance with an embodiment of the present disclosure.

FIG. 11 is a flowchart 1100 illustrating a method for texture interpolation, in accordance with an embodiment of the present disclosure. As can be seen, the method is described with reference to the configuration of operational texture interpolation system module 320, of FIG. 8. However, any number of module configurations can be used to implement the method, as will be appreciated in light of this disclosure. Further note that the various functions depicted in the method do not need to be assigned to the specific example modules shown. To this end, the example methodology depicted is provided to give one example embodiment and is not intended to limit the methodology to any particular physical or structural configuration.

The method commences, at operation 1110, by applying texture images to a global encoder network which is trained to generate global latent vectors based on the texture images. The method continues, at operation 1120, by applying the texture images to a local encoder network which is trained to generate local latent tensors based on the texture images.

At operation 1130, a spatial repetition is performed on the sets of global latent vectors associated with each of the texture images. The spatial repetition may comprise reshaping of the global latent vectors into tensors and repeating the tensors to match the spatial dimensions of the local latent tensors.

At operation 1140, an optional tiling operation may be performed on the sets of local latent tensors associated with each of the texture images, and at operation 1145, an optional shuffling may be performed on the tiled local latent tensors.

At operation 1150, an interpolation is performed between the spatial repetitions of the sets of global latent vectors to generate a global vector interpolation. An interpolation is also performed between the tiled sets of local latent tensors to generate a local tensor interpolation.

At operation 1160, the global vector interpolation and the local tensor interpolation are applied to a decoder network which is trained to generate an interpolated texture based on the global vector interpolation and the local tensor interpolation.

In some embodiments, additional operations are performed. For example, in one embodiment, the global latent vector interpolation and the local latent tensor interpolation are based on linear weighting factors. These weighting factors may be user provided or heuristically selected. For example, the user may select the weighting factors to determine the desired proportions or blend of textures.

Example Platform

Figure 12:
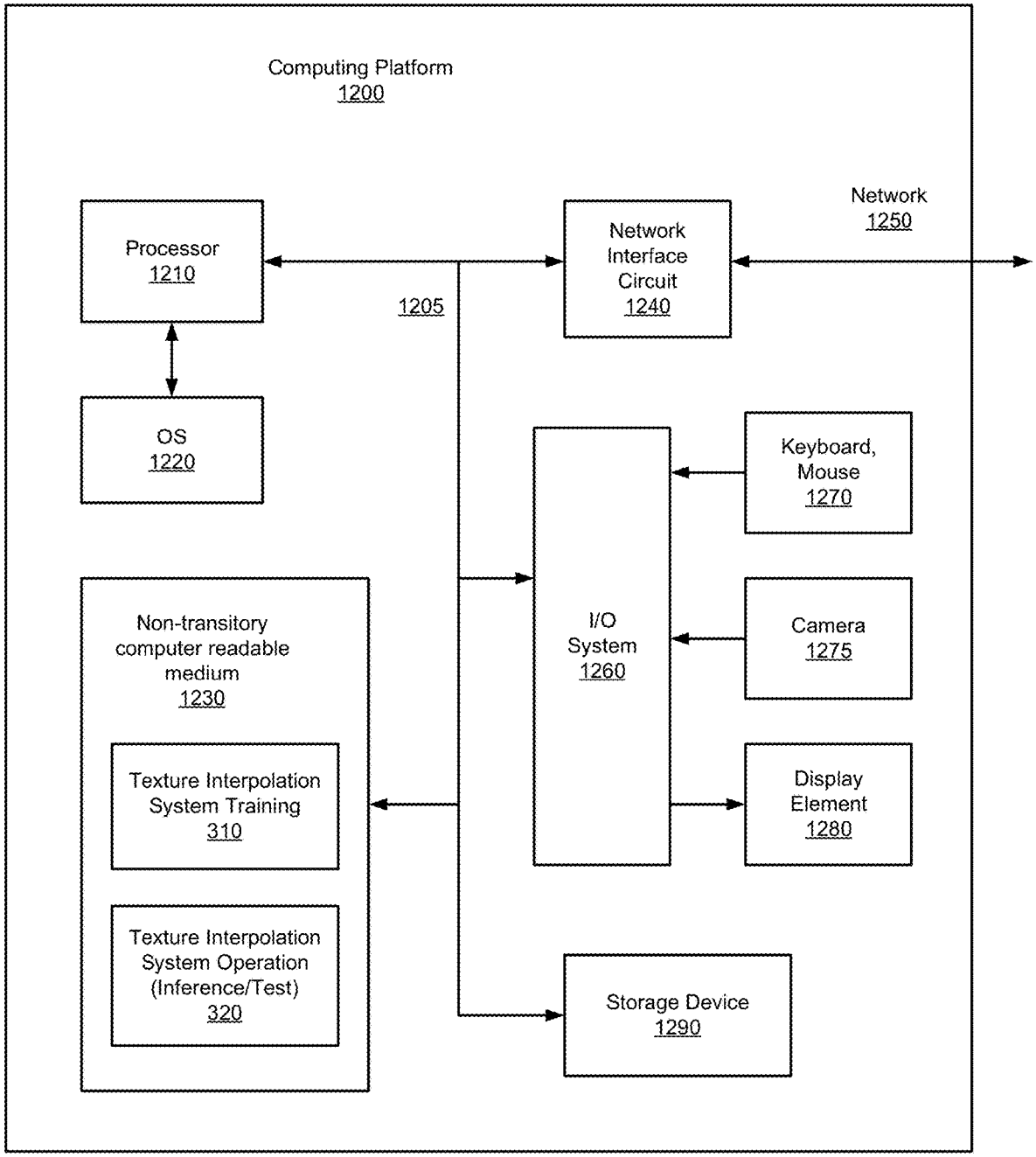
FIG. 12 is a block diagram schematically illustrating a computing platform configured to perform any of the techniques as variously described in this disclosure, configured in accordance with an embodiment of the present disclosure.

FIG. 12 is a block diagram schematically illustrating a computing platform 1200 configured to perform any of the techniques as variously described in this disclosure, configured in accordance with an embodiment of the present disclosure. For example, in some embodiments, the texture interpolation system training module 310 and texture interpolation system operation module 320 of FIG. 3, or any portions thereof as illustrated in FIGS. 4-8, and the methodologies of FIGS. 10 and 11, or any portions thereof, are implemented in the computing platform 1200. In some embodiments, the computing platform 1200 is a computer system, such as a workstation, desktop computer, server, laptop, handheld computer, tablet computer (e.g., the iPad tablet computer), mobile computing or communication device (e.g., the iPhone mobile communication device, the Android mobile communication device, and the like), or other form of computing or telecommunications device that has sufficient processor power and memory capacity to perform the operations described in this disclosure. In some embodiments, a distributed computational system is provided comprising a plurality of such computing devices.

The computing platform 1200 includes one or more storage devices 1290 and/or non-transitory computer-readable media 1230 having encoded thereon one or more computer-executable instructions or software for implementing techniques as variously described in this disclosure. In some embodiments, the storage devices 1290 include a computer system memory or random access memory, such as a durable disk storage (e.g., any suitable optical or magnetic durable storage device, including RAM, ROM, Flash, USB drive, or other semiconductor-based storage medium), a hard-drive, CD-ROM, or other computer readable media, for storing data and computer-readable instructions and/or software that implement various embodiments as taught in this disclosure. In some embodiments, the storage device 1290 includes other types of memory as well, or combinations thereof. In one embodiment, the storage device 1290 is provided on the computing platform 1200. In another embodiment, the storage device 1290 is provided separately or remotely from the computing platform 1200. The non-transitory computer-readable media 1230 include, but are not limited to, one or more types of hardware memory, non-transitory tangible media (for example, one or more magnetic storage disks, one or more optical disks, one or more USB flash drives), and the like. In some embodiments, the non-transitory computer-readable media 1230 included in the computing platform 1200 store computer-readable and computer-executable instructions or software for implementing various embodiments. In one embodiment, the computer-readable media 1230 are provided on the computing platform 1200. In another embodiment, the computer-readable media 1230 are provided separately or remotely from the computing platform 1200.

The computing platform 1200 also includes at least one processor 1210 for executing computer-readable and computer-executable instructions or software stored in the storage device 1290 and/or non-transitory computer-readable media 1230 and other programs for controlling system hardware. In some embodiments, virtualization is employed in the computing platform 1200 so that infrastructure and resources in the computing platform 1200 are shared dynamically. For example, a virtual machine is provided to handle a process running on multiple processors so that the process appears to be using only one computing resource rather than multiple computing resources. In some embodiments, multiple virtual machines are used with one processor.

As can be further seen, a bus or interconnect 1205 is also provided to allow for communication between the various components listed above and/or other components not shown. Computing platform 1200 can be coupled to a network 1250 (e.g., a local or wide area network such as the internet), through network interface circuit 1240 to allow for communications with other computing devices, platforms, resources, clients, and Internet of Things (IoT) devices.

In some embodiments, a user interacts with the computing platform 1200 through an input/output system 1260 that interfaces with devices such as a keyboard and mouse 1270, a camera 1275, and/or a display element (screen/monitor) 1280. The keyboard and mouse may be configured to provide a user interface to accept user input and guidance, for example to select textures from a palette, to perform texture paining, and to otherwise control the texture interpolation process using image processing applications/tools. The camera may be configured, for example, to provide images for processing using the disclosed techniques. The display element may be configured, for example, to display the image before, during and after processing using the disclosed techniques. In some embodiments, the computing platform 1200 includes other I/O devices (not shown) for receiving input from a user, for example, a pointing device or a touchpad, etc., or any suitable user interface. In some embodiments, the computing platform 1200 includes other suitable conventional I/O peripherals. The computing platform 1200 can include and/or be operatively coupled to various suitable devices for performing one or more of the aspects as variously described in this disclosure.

In some embodiments, the computing platform 1200 runs an operating system (OS) 1220, such as any of the versions of Microsoft Windows operating systems, the different releases of the Unix and Linux operating systems, any version of the MacOS for Macintosh computers, any embedded operating system, any real-time operating system, any open source operating system, any proprietary operating system, any operating systems for mobile computing devices, or any other operating system capable of running on the computing platform 1200 and performing the operations described in this disclosure. In one embodiment, the operating system runs on one or more cloud machine instances.

As will be appreciated in light of this disclosure, the various modules and components of the system, as shown in FIGS. 1 and 7-10, can be implemented in software, such as a set of instructions (e.g., HTML, XML, C, C++, object-oriented C, JavaScript, Java, BASIC, etc.) encoded on any computer readable medium or computer program product (e.g., hard drive, server, disc, or other suitable non-transient memory or set of memories), that when executed by one or more processors, cause the various methodologies provided in this disclosure to be carried out. It will be appreciated that, in some embodiments, various functions and data transformations performed by the computing system, as described in this disclosure, can be performed by similar processors in different configurations and arrangements, and that the depicted embodiments are not intended to be limiting. Various components of this example embodiment, including the computing platform 1200, can be integrated into, for example, one or more desktop or laptop computers, workstations, tablets, smart phones, game consoles, set-top boxes, or other such computing devices. Other componentry and modules typical of a computing system, such as, for example a co-processor, a processing core, a graphics processing unit, a touch pad, a touch screen, etc., are not shown but will be readily apparent.

In other embodiments, the functional components/modules are implemented with hardware, such as gate level logic (e.g., FPGA) or a purpose-built semiconductor (e.g., ASIC). Still other embodiments are implemented with a microcontroller having a number of input/output ports for receiving and outputting data, and a number of embedded routines for carrying out the functionality described in this disclosure. In a more general sense, any suitable combination of hardware, software, and firmware can be used, as will be apparent.

Further Example Embodiments

Numerous example embodiments will be apparent, and features described herein can be combined in any number of configurations.

Example 1 is a method for interpolating textures, the method comprising: applying, by a processor-based system, a first texture image to a global encoder network, the global encoder network trained to generate a first set of global latent vectors based on the first texture image; applying, by the processor-based system, a second texture image to the global encoder network to generate a second set of global latent vectors based on the second texture image; performing, by the processor-based system, a spatial repetition of the first set of global latent vectors and of the second set of global latent vectors; interpolating, by the processor-based system, between the spatial repetition of the first set of global latent vectors and the spatial repetition of the second set of global latent vectors, to generate a global vector interpolation; applying, by the processor-based system, the global vector interpolation to a decoder network, the decoder network trained to generate an interpolated texture based on the global vector interpolation.

Example 2 includes the subject matter of Example 1, further comprising: applying, by the processor-based system, the first texture image to a local encoder network, the local encoder network trained to generate a first set of local latent tensors based on the first texture image; applying, by the processor-based system, the second texture image to the local encoder network to generate a second set of local latent tensors based on the second texture image; performing, by the processor-based system, a spatial tiling operation on the first set of local latent tensors and on the second set of local latent tensors; interpolating, by the processor-based system, between the tiled first set of local latent tensors and the tiled second set of local latent tensors, to generate a local tensor interpolation; and applying, by the processor-based system, the local tensor interpolation to the decoder network, the decoder network trained to generate an interpolated texture based on the global vector interpolation and the local tensor interpolation.

Example 3 includes the subject matter of Examples 1 or 2, wherein the local encoder network comprises a first local encoder network to process a first set of regions of an applied texture image, and a second local encoder network to process a second set of regions of the applied texture image, the first set of regions associated with a first set of spatial dimensions, the second set of regions associated with a second set of spatial dimensions.

Example 4 includes the subject matter of any of Examples 1-3, wherein the global latent vector interpolation and the local latent tensor interpolation are based on linear weighting factors, the linear weighting factors being user provided or heuristically selected.

Example 5 includes the subject matter of any of Examples 1-4, wherein the training of the global encoder network, the local encoder network, and the decoder network is based on (1) a minimization of a reconstruction loss function of training texture images and (2) a minimization of an interpolation loss function of interpolated training texture images.

Example 6 includes the subject matter of any of Examples 1-5, wherein the spatial repetition comprises reshaping the global latent vectors into tensors and repeating the tensors to match spatial dimensions of the local latent tensors.

Example 7 includes the subject matter of any of Examples 1-6, wherein the decoder network is a generative adversarial network.

Example 8 is a method for training a neural network based texture interpolation system, the method comprising: training, by a processor-based system, a global encoder network to generate a first set of global latent vectors based on a first training texture image and to generate a second set of global latent vectors based on a second training texture image; training, by the processor-based system, a local encoder network to generate a first set of local latent tensors based on the first training texture image and to generate a second set of local latent tensors based on the second training texture image; interpolating, by the processor-based system, between the first set and the second set of the global latent vectors; interpolating, by the processor-based system, between the first set and the second set of the local latent tensors; and training, by the processor-based system, a decoder network to generate a reconstruction of the first training texture image, and an interpolated texture based on the interpolated global latent vectors and the interpolated local latent tensors, wherein the training of the global encoder network, the local encoder network, and the decoder network is based on a minimization of a loss function of the reconstruction of the first training texture image and a minimization of a loss function of the interpolated texture.

Example 9 includes the subject matter of Example 8, wherein the local encoder network comprises a first local encoder network to process a first set of regions of a training texture image, and a second local encoder network to process a second set of regions of the training texture image, the first set of regions associated with a first set of spatial dimensions, the second set of regions associated with a second set of spatial dimensions.

Example 10 includes the subject matter of Examples 8 or 9, further comprising performing a spatial tiling operation on the local latent tensors and performing a shuffle operation on the tiled local latent tensors.

Example 11 includes the subject matter of any of Examples 8-10, wherein the shuffle operation is a random shuffle of the tiled local latent tensors by row and column over a plurality of spatial scales.

Example 12 includes the subject matter of any of Examples 8-11, wherein the loss function of the reconstructions comprises one or more of a pixel-wise sum of absolute differences loss, a Gram matrix loss, and an adversarial loss;

and the loss function of the interpolated texture comprises a Gram matrix loss and an adversarial loss.

Example 13 includes the subject matter of any of Examples 8-12, wherein the global latent vector interpolation and the local latent tensor interpolation are based on linear weighting factors.

Example 14 includes the subject matter of any of Examples 8-13, wherein the decoder network is a generative adversarial network.

Example 15 is a computer program product including one or more non-transitory machine-readable mediums encoded with instructions that when executed by one or more processors cause a process to be carried out for texture interpolation, the process comprising: applying a first texture image to a local encoder network, the local encoder network trained to generate a first set of local latent tensors based on the first texture image; applying a second texture image to the local encoder network to generate a second set of local latent tensors based on the second texture image; performing a tiling operation on the first set of local latent tensors and on the second set of local latent tensors; interpolating between the tiled first set of local latent tensors and the tiled second set of local latent tensors, to generate a local tensor interpolation; and applying the local tensor interpolation to a decoder network, the decoder network trained to generate an interpolated texture based on the local tensor interpolation.

Example 16 includes the subject matter of Example 15, the process further comprising: applying the first texture image to a global encoder network, the global encoder network trained to generate a first set of global latent vectors based on the first texture image; applying the second texture image to the global encoder network to generate a second set of global latent vectors based on the second texture image; performing a spatial repetition of the first set of global latent vectors and of the second set of global latent vectors; interpolating between the spatial repetition of the first set of global latent vectors and the spatial repetition of second set of global latent vectors, to generate a global vector interpolation; applying the global vector interpolation and the local tensor interpolation to the decoder network, the decoder network trained to generate an interpolated texture based on the global vector interpolation and the local tensor interpolation.

Example 17 includes the subject matter of Examples 15 or 16, wherein the global latent vector interpolation and the local latent tensor interpolation are based on linear weighting factors, and the linear weighting factors are user provided or heuristically selected.

Example 18 includes the subject matter of any of Examples 15-17, wherein the training of the global encoder network, the local encoder network, and the decoder network is based on (1) a minimization of a reconstruction loss function of training texture images and (2) a minimization of an interpolation loss function of interpolated training texture images.

Example 19 includes the subject matter of any of Examples 15-18, wherein the reconstruction loss function comprises one or more of a pixel-wise sum of absolute differences loss, a Gram matrix loss, and an adversarial loss; and the interpolation loss function comprises a Gram matrix loss and an adversarial loss.

Example 20 includes the subject matter of any of Examples 15-19, wherein the spatial repetition comprises reshaping the global latent vectors into tensors and repeating the tensors to match spatial dimensions of the local latent tensors.

The foregoing description of example embodiments of the disclosure has been presented for the purposes of illustration and description. It is not intended to be exhaustive or to limit the disclosure to the precise forms disclosed. Many modifications and variations are possible in light of this disclosure. It is intended that the scope of the disclosure be limited not by this detailed description, but rather by the claims appended hereto.

What is claimed is:

1. A method for interpolating textures, the method comprising:
    applying, by a processor-based system, a first texture image to a global encoder network, the global encoder network trained to generate a first set of global latent vectors based on the first texture image;
    applying, by the processor-based system, a second texture image to the global encoder network to generate a second set of global latent vectors based on the second texture image;
    performing, by the processor-based system, a spatial repetition of the first set of global latent vectors and of the second set of global latent vectors;
    interpolating, by the processor-based system, between the spatial repetition of the first set of global latent vectors and the spatial repetition of the second set of global latent vectors, to generate a global vector interpolation;
    applying, by the processor-based system, the global vector interpolation to a decoder network, the decoder network trained to generate an interpolated texture based on the global vector interpolation.

2. The method of claim 1, further comprising:
    applying, by the processor-based system, the first texture image to a local encoder network, the local encoder network trained to generate a first set of local latent tensors based on the first texture image;
    applying, by the processor-based system, the second texture image to the local encoder network to generate a second set of local latent tensors based on the second texture image;
    performing, by the processor-based system, a spatial tiling operation on the first set of local latent tensors and on the second set of local latent tensors;
    interpolating, by the processor-based system, between the tiled first set of local latent tensors and the tiled second set of local latent tensors, to generate a local tensor interpolation; and
    applying, by the processor-based system, the local tensor interpolation to the decoder network, the decoder network trained to generate an interpolated texture based on the global vector interpolation and the local tensor interpolation.

3. The method of claim 2, wherein the local encoder network comprises a first local encoder network to process a first set of regions of an applied texture image, and a second local encoder network to process a second set of regions of the applied texture image, the first set of regions associated with a first set of spatial dimensions, the second set of regions associated with a second set of spatial dimensions.

4. The method of claim 2, wherein the global latent vector interpolation and the local latent tensor interpolation are based on linear weighting factors, the linear weighting factors being user provided or heuristically selected.

5. The method of claim 2, wherein the training of the global encoder network, the local encoder network, and the decoder network is based on (1) a minimization of a reconstruction loss function of training texture images and (2) a minimization of an interpolation loss function of interpolated training texture images.

6. The method of claim 2, wherein the spatial repetition comprises reshaping the first and second sets of global latent vectors into tensors and repeating the tensors to match spatial dimensions of the first and second sets of local latent tensors.

7. The method of claim 1, wherein the decoder network is a generative adversarial network.

8. A method for training a neural network based texture interpolation system, the method comprising:
training, by a processor-based system, a global encoder network to generate a first set of global latent vectors based on a first training texture image and to generate a second set of global latent vectors based on a second training texture image;
training, by the processor-based system, a local encoder network to generate a first set of local latent tensors based on the first training texture image and to generate a second set of local latent tensors based on the second training texture image;
interpolating, by the processor-based system, between the first set and the second set of the global latent vectors;
interpolating, by the processor-based system, between the first set and the second set of the local latent tensors; and
training, by the processor-based system, a decoder network to generate a reconstruction of the first training texture image, and an interpolated texture based on the interpolated global latent vectors and the interpolated local latent tensors,
wherein the training of the global encoder network, the local encoder network, and the decoder network is based on a minimization of a loss function of the reconstruction of the first training texture image and a minimization of a loss function of the interpolated texture.

9. The method of claim 8, wherein the local encoder network comprises a first local encoder network to process a first set of regions of a training texture image, and a second local encoder network to process a second set of regions of the training texture image, the first set of regions associated with a first set of spatial dimensions, the second set of regions associated with a second set of spatial dimensions.

10. The method of claim 9, wherein the shuffle operation is a random shuffle of the tiled local latent tensors by row and column over a plurality of spatial scales.

11. The method of claim 8, further comprising performing a spatial tiling operation on the first and second sets of local latent tensors and performing a shuffle operation on the tiled local latent tensors.

12. The method of claim 8, wherein the loss function of the reconstructions comprises one or more of a pixel-wise sum of absolute differences loss, a Gram matrix loss, and an adversarial loss; and the loss function of the interpolated texture comprises a Gram matrix loss and an adversarial loss.

13. The method of claim 8, wherein the global latent vector interpolation and the local latent tensor interpolation are based on linear weighting factors.

14. The method of claim 8, wherein the decoder network is a generative adversarial network.

15. A computer program product including one or more non-transitory machine-readable mediums encoded with instructions that when executed by one or more processors cause a process to be carried out for texture interpolation, the process comprising:
applying a first texture image to a local encoder network, the local encoder network trained to generate a first set of local latent tensors based on the first texture image;
applying a second texture image to the local encoder network to generate a second set of local latent tensors based on the second texture image;
performing a tiling operation on the first set of local latent tensors and on the second set of local latent tensors;
interpolating between the tiled first set of local latent tensors and the tiled second set of local latent tensors, to generate a local tensor interpolation; and
applying the local tensor interpolation to a decoder network, the decoder network trained to generate an interpolated texture based on the local tensor interpolation.

16. The computer program product of claim 15, the process further comprising:
applying the first texture image to a global encoder network, the global encoder network trained to generate a first set of global latent vectors based on the first texture image;
applying the second texture image to the global encoder network to generate a second set of global latent vectors based on the second texture image;
performing a spatial repetition of the first set of global latent vectors and of the second set of global latent vectors;
interpolating between the spatial repetition of the first set of global latent vectors and the spatial repetition of second set of global latent vectors, to generate a global vector interpolation;
applying the global vector interpolation and the local tensor interpolation to the decoder network, the decoder network trained to generate an interpolated texture based on the global vector interpolation and the local tensor interpolation.

17. The computer program product of claim 16, wherein the global latent vector interpolation and the local latent tensor interpolation are based on linear weighting factors, and the linear weighting factors are user provided or heuristically selected.

18. The computer program product of claim 16, wherein the training of the global encoder network, the local encoder network, and the decoder network is based on (1) a minimization of a reconstruction loss function of training texture images and (2) a minimization of an interpolation loss function of interpolated training texture images.

19. The computer program product of claim 18, wherein the reconstruction loss function comprises one or more of a pixel-wise sum of absolute differences loss, a Gram matrix loss, and an adversarial loss; and the interpolation loss function comprises a Gram matrix loss and an adversarial loss.

20. The computer program product of claim 16, wherein the spatial repetition comprises reshaping the first and second sets of global latent vectors into tensors and repeating the tensors to match spatial dimensions of the first and second sets of local latent tensors.

* * * * *